(12) United States Patent
Farquhar et al.

(10) Patent No.: US 8,186,262 B2
(45) Date of Patent: May 29, 2012

(54) METHODS AND STRUCTURES FOR SANDWICH PANELS WITH IMPROVED RESISTANCE TO BALLISTIC PENETRATION

(75) Inventors: Tony Farquhar, Catonsville, MD (US); Richard Brian Marlowe, Rockville, MD (US)

(73) Assignee: The University of Maryland at Baltimore County, Baltimore, MD (US)

( * ) Notice: Subject to any disclaimer, the term of this patent is extended or adjusted under 35 U.S.C. 154(b) by 1274 days.

(21) Appl. No.: 11/799,254

(22) Filed: May 1, 2007

(65) Prior Publication Data

US 2011/0005382 A1    Jan. 13, 2011

Related U.S. Application Data

(60) Provisional application No. 60/796,603, filed on May 1, 2006.

(51) Int. Cl.
*F41H 5/00* (2006.01)

(52) U.S. Cl. .......................................... 89/36.01; 89/902

(58) Field of Classification Search ....... 89/36.01–36.17
See application file for complete search history.

(56) References Cited

U.S. PATENT DOCUMENTS

| | | | | | |
|---|---|---|---|---|---|
| 5,102,723 | A | * | 4/1992 | Pepin | 428/223 |
| 6,027,798 | A | * | 2/2000 | Childress | 428/319.3 |
| 2005/0025929 | A1 | * | 2/2005 | Smith et al. | 428/73 |
| 2006/0213360 | A1 | * | 9/2006 | Ravid et al. | 89/36.01 |
| 2007/0180982 | A1 | * | 8/2007 | Dagher et al. | 89/36.02 |
| 2009/0114083 | A1 | * | 5/2009 | Moore et al. | 89/36.02 |
| 2009/0308238 | A1 | * | 12/2009 | Schwartz | 89/36.02 |

* cited by examiner

*Primary Examiner* — Michael Carone
*Assistant Examiner* — Samir Abdosh
(74) *Attorney, Agent, or Firm* — Benjamin Aaron Adler (57) ABSTRACT

Provided herein methods and structures for construction of light weight sandwich panels or load-bearing panels having improved ballistic protection. The methods disclosed can facilitate construction of a hybrid core comprising ballistic fabrics and deformable pins that exhibit superior resistance to ballistic penetration. The methods and structures of the present disclosures can be advantageously used in many applications, such as armored vehicles.

34 Claims, 3 Drawing Sheets

METHODS AND STRUCTURES FOR SANDWICH PANELS WITH IMPROVED RESISTANCE TO BALLISTIC PENETRATION

CROSS-REFERENCE TO RELATED APPLICATION

This non-provisional application claims benefit of priority of provisional U.S. Ser. No. 60/796,603, filed May 1, 2006, now abandoned.

BACKGROUND OF THE INVENTION

1. Field of Invention

The present invention relates to the fields of ballistic armor for lightweight structures including aerospace vehicles and for sandwich panel construction techniques. More specifically, the present invention relates to methods and structures for sandwich panel construction that provide improved resistance to ballistic penetration.

2. Description of the Related Art

Sandwich panels have been used widely in all types of situations where light weight and high structural strength are required. Sandwich panels have been used extensively in the aerospace industry. For example, sandwich panels are used in aircraft structural parts and control surfaces as well as cabin floors and other interior panels. Sandwich panels could be, but are not yet generally used in many other structural applications where the ability to absorb relatively large amounts of impact energy is an additional important consideration. For example, U.S. Patent Publication 20050025929 discloses sandwich panels that also used in a variety of civil engineering and building construction applications where preformed structural panels are assembled together to form various exterior and interior structural elements of a building.

Sandwich panel construction is widely used in aerospace industry due to its distinct advantages in terms of stiffness, strength, stability, corrosion resistance, and above all, weight savings. One advantage of sandwich construction is that specific flexural stiffness and strength can be high. However, a notable weakness of the existing sandwich panels is that out-of-plane impact strength is very poor and can barely slow a ballistic projectile. Several approaches have been attempted to overcome the weakness of existing panels including addition of a hard ceramic front surface, often alumina or boron carbide composites, that can spread impact forces while blunting or breaking up the projectile, use of compliant or weakened sub-structures and/or a ballistic fabric anti-spall liner that can be fastened behind the panel to capture penetrating fragments or spalled chips, each with varying degrees of success.

Sandwich panels typically include two sheets of material, referred to as face sheets or rigid sheets or skins, that are bonded to opposite sides of a core to form a sandwich. The core is usually made from materials that are much more lightweight than the skins. For example, the core is most commonly a honeycomb or other foam-like cellular solid or structures. U.S. Pat. No. 5,102,723 describes a sandwich panel that uses rigid pins between the face sheets for the express purpose of mechanically stiffening and strengthening the core material. This patent also describes a sandwich panel where the face sheets and foam core form a preliminary structure and where a plurality of Z-pins is driven through one or both face sheets for reinforcement. U.S. Pat. No. 6,027,798 also discloses a pin reinforced sandwich structure that allows for a variety of combinations of the three main components, i.e., face sheets, foam core and Z-pins.

The materials used in high performance aircraft require unique blends of light weight, stiffness, strength, durability, and impact tolerance. Severe loads and environments often dictate the use of sandwich structures with minimal resistance to ballistic impact. When such panels comprise most of an aircraft's structure, vehicle survivability depends more on the location than the intensity of a weapon strike. The decision to armor has to balance protection of crew and flight critical equipment against the negative effect of extra weight on payload, mobility, and range.

Where stressed skin aircraft structures are vulnerable to high speed projectiles such as the components of disintegrating turbine engines, various military projectiles, or other high-velocity fragment sources, it is desirable that these structures or panels offer substantial resistance to penetration while simultaneously bearing the structural loads imposed on the aircraft. To date, this has generally been achieved by proving structural support and impact resistance via separate elements that are designed and fabricated independently. For this reason, existing sandwich panel technology can not achieve these two separate functions in a weight optimal fashion.

Thus, there is a recognized need in the art to provide improved sandwich panel materials and fabrication methods. Specifically, the prior art is deficient in sandwich panels that would absorb the impact energy of projectiles while minimally compromising payload capacity. The present invention fulfills this longstanding need in the art.

SUMMARY OF INVENTION

This summary is provided to introduce a selection of inventive aspects of the present application in a simplified form that are further described below in the detailed description of the invention. This summary is not intended to identify key features or essential features of the claimed subject matter, nor is it intended to be used as an aid in determining the scope of the claimed subject matter.

One objective of the present invention is to develop a structural sandwich panel that combines the high specific strength and stiffness of currently available sandwich construction materials with superior resistance to ballistic penetration. Another objective of the present invention is to develop a hybrid core or tooling material that can protect extremely weight sensitive structures, especially, but not limited to aerospace vehicle structures, that might otherwise remain unarmored.

Another objective of the invention is to provide ballistic resistance through an innovative combination of crushable or breakable sacrificial pins and an antiballistic fabric, encased within panels with the primary conventional function of providing structural support to a vehicle. Another objective of the present invention is to prevent through penetration by a focused ballistic threat without greatly increasing the weight of the structure by providing sufficient open interior space to allow the absorption and dissipation of substantial amounts of strain energy prior to allowing the projectile to make contact with the rear face sheet.

Another objective is to decouple the thermal expansion or contraction of the front face sheet from that of the rear face sheet, in applications were the two face sheets are made of dissimilar materials and/or are subjected to different temperature extremes, by providing only a specified and limited degree of mechanical shear coupling between the two face sheets.

Another objective is to create a structure with an innate self-diagnostic capacity to locate and quantify the degree of damage that has occurred during a ballistic strike, by means of substantial changes in through thickness thermal and/or electrical conductivity that can be measured from the rear side of the panel.

Thus, the present invention is directed to a sandwich panel. The panel comprises at least two rigid face sheets having a core region formed each of a pair of the at least two rigid face sheets and at least one layer of a fabric contained within each core region where the fabric layer(s) have an aggregate thickness selected to provide sufficient space within the core region to allow conformity by the fabric layer(s) to a projectile impacting thereon. A plurality of pins extends through the fabric layer(s) within each core region and are secured to the face sheets forming each core region such that the fabric layer(s) are held in place thereby. The pins comprise an optimally weak pin material whereby the plurality of secured pins is configured within the core region(s) such that one or more of elastic pin deformation, pin yielding, pin breakage or other pin failure occurs transversely along the fabric layer(s) away from a point of projectile impact.

The present invention also is directed to a related lightweight load-bearing panel providing protection from projectile impact for a structure in need thereof. The lightweight load-bearing panel comprises at least two rigid face sheets, including a front face sheet and a rear face sheet, and has an open core region formed between each of a pair of the at least two rigid face sheets. The lightweight load-bearing panel also comprises the layer(s) of fabric and the plurality of pins configured as with the sandwich panel described supra.

The present invention is directed further to a method of fabricating a sandwich panel. The method of fabricating comprises selecting panel components comprising the sandwich panel described herein, placing the plurality of pins through at least one layer of the ballistic fabric such that the pins traverse the fabric, positioning the pinned fabric within the core region (s) formed between one or more of a pair of the face sheets, and securing the pins to the inner surfaces of the face sheet pairs to form a pin configuration, thereby fabricating the sandwich panel. The present invention is directed to a related method further comprising the step of surrounding the pinned fabric with one or more layers of a low density tooling material effective to hold the pins in place prior to securing the pins. Further to this related method of fabricating, the present invention is directed to another related method step comprising substantially dissolving the one or more layers of the low density tooling material after securing the pins. The present invention is directed to yet another related method comprising the step of armoring a vehicle with the sandwich panel.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

BRIEF DESCRIPTIONS OF DRAWINGS

So that the matter in which the above-recited features, advantages and objects of the invention as well as others which will become clear are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF INVENTION

As used herein, the term "a" or "an" when used in conjunction with the term "comprising" in the claims and/or the specification may mean "one," but it is also consistent with the meaning of "one or more," "at least one," and "one or more than one." As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the terms "rigid face sheet", "skin" and "face sheet" are intended to be interchangeable.

As used herein, the terms "pins" or "sacrificial pins" refer to relatively slender solid or hollow pins, headed or un-headed nails, rods, other rod- or truss-like members and any equivalent structures known in the art. The pins used in different embodiments are chosen such that they are either deformable, breakable or crushable upon impact and because of this property these pins also are considered to be sacrificial pins. As such the terms "traverse" or "traversing" refer to pin placement in a ballistic fabric or pin securement to one or more face sheets whereby one or both ends of the pin extend through one or both surfaces of the ballistic fabric or of the face sheets.

As used herein, the terms "fabric", "ballistic fabric" and "textile" are used interchangeably and refer to any uncoated or lightly-coated textile or fabric that can capture and/or dissipate, by means of sliding friction or innate material dissipation, the kinetic energy of impacting projectiles. Some non-limiting examples include woven fabrics made of polyamides or nylons, fabrics made of aromatic polyamides or aramides (ex., KEVLAR from Dupont, USA; GOLDFLEX from Honeywell, USA; and TWARON from Taijin), ultra high molecular weight polyethylenes (ex., DYNEEMA from Toyobo/DSW; SPECTRA 1000 from Honeywell, USA), and poly-phenylene-benzobisoxazole, or blends therefor. Other examples of fabrics included woven plain carbon, alloy, or 300 and 400 series stainless steels, or aluminum, or titanium, or other metal clothes. Fabrics comprised of many of these materials are as plain and satin weaves, as various specialty weaves, as non-woven felted or needle-punched mats, or as lightly coated laminates, often cross-ply laminates. A person skilled in the art would appreciate that the described above are only exemplary of many fabrics available that can capture and dissipate the kinetic energy of impacting projectiles. Thus, the scope of the present invention includes all fabrics, ballistic or otherwise, known to persons skilled in the art.

In one embodiment of the present invention there is provided a sandwich panel, comprising at least two rigid face sheets; a core region formed between each of a pair of the at least two rigid face sheets; at least one layer of a fabric contained within each core region, said fabric layer(s) having an aggregate thickness selected to provide sufficient space within the core region to allow conformity by the fabric layer(s) to a projectile impacting thereon; and a plurality of pins extending through the fabric layer(s) within each core region and secured to the face sheets forming each core region such that the fabric layer(s) are held in place thereby, said pins comprising an optimally weak pin material wherein the plurality of secured pins is configured within the core region(s) such that one or more of elastic pin deformation, pin yielding, pin breakage or other pin failure occurs transversely along the fabric layer(s) away from a point of projectile impact.

In one aspect of this embodiment the core region may comprise a low density tooling material. Representative examples of a tooling material comprise polymers, metals, carbon foam, an open cell honeycomb, a closed cell honeycomb, corrugated structures, periodic structures, or cellular structures. In another aspect of this embodiment the core region may be an open core region. An open core region may be formed by substantially dissolving the layer(s) of tooling material.

In all aspects of this embodiment the pin configuration may have one or both of a through-thickness thermal or electrical conductivity substantially less than that of the pin material. Also, a change in one or both of the pin through-thickness thermal or electrical conductivity provides a means for self-diagnosising damage from a non-penetrating projectile strike at a rear face sheet of the sandwich panel. In addition the pins are configured such that up to 10,000 pins are effected upon projectile impact.

Also, in all aspects of this embodiment, the ends of the pins are bonded, brazed, welded, or adhered to or embedded within an inner surface of the face sheets. Also, the pins may be secured such that the axes thereof relative to the face sheets form one or more angles within the range of about 0 degrees to about 60 degrees from the perpendicular. In one preferred aspect, the pins may be secured at different angles and configured to form a self-bracing pyramidal truss. In addition, the panel may have about 100 to about 10000 pins per square inch secured therewithin.

Also, in all aspects the pins may comprise a material or a composite material with an average Young's modulus within the range of about 0.1 Msi to about 100 Msi. In addition, the pin materials may be natural or engineered wood products, natural or man-made polymers, ceramics, boron, silicon carbide, glass, or metals. Furthermore, in all aspects a pin cross-section may be circular or non-circular with an average diameter from about 0.001 inches to about 0.2 inches. In addition, in all aspects of this embodiment the aggregate thickness of the fabric layer(s) may be substantially less than a total thickness of the core region. Particularly, the aggregate thickness of the fabric layers may be about 0.005 inches to about 5 inches.

In a related embodiment the present invention provides load-bearing panel providing protection from projectile impact for a lightweight structure, comprising at least two rigid face sheets including a front face sheet and a rear face sheet; a open core region formed between each of a pair of the at least two rigid face sheets; at least one layer of a fabric contained within each open core region, said fabric layer(s) having an aggregate thickness selected to provide sufficient space within the open core region to allow conformity by the fabric layer(s) to a projectile impacting thereon; and a plurality of pins extending through the fabric layer(s) within each open core region and secured to the face sheets forming each core region such that the fabric layer(s) are held in place thereby, said pins comprising an optimally weak pin material wherein the plurality of secured pins is configured within the open core region(s) such that one or more of elastic pin deformation, pin yielding, pin breakage or other pin failure occurs transversely along the fabric layer(s) away from a point of projectile impact.

In this embodiment the structure may be an armored military vehicle at risk for sustaining weapon strikes or a manned or unmanned space vehicle at risk for sustaining micrometeoroid strikes. Also, in this embodiment the fabric, the pins, the thermal and electrical conductivity, and the open core region are as described supra.

In another embodiment of the present invention there is provided a method for fabricating a sandwich panel, comprising selecting panel components comprising the sandwich panel described supra; placing the plurality of pins through at least one layer of the fabric such that the pins traverse the fabric; positioning the pinned fabric within the core region(s) formed between one or more of a pair of the face sheets; and securing the pins to the inner surfaces of the face sheet pairs to form a pin configuration, thereby fabricating the sandwich panel.

Further to this embodiment the method may comprise surrounding the pinned fabric with one or more layers of a low density tooling material effective to hold the pins in place prior to securing the pins. Representative examples of the low density tooling material are as described supra. Further still the method may comprise substantially dissolving the one or more layers of the low density tooling material after securing the pins. In another further embodiment the method may comprise armoring a vehicle with the sandwich panel. Examples of the armored vehicle are a military fixed wing aircraft or helicopter at risk for sustaining weapon strikes or a manned or an unmanned space vehicle at risk for sustaining micrometeoroid strikes.

In all embodiments, the pins are configured not to traverse rear face sheet comprising the at least two face sheets after a projectile strike. Also, the secured pin configuration may maintain the fabric layer(s) substantially in the middle of the core region(s) while minimally constraining the fabric from conforming to an incoming projectile. In addition in all embodiments the components of the sandwich panel, i.e., the face sheets, the core region, the tooling materials, the fabric and the pins, are as described supra.

The subject matter of the present invention relates to a sandwich panel that can be integrated into armored vehicle structural designs. The sandwich panel utilizes an open core region containing one or more fabric layers held in place by an optimally spaced pin array. The pins are purposefully weak and are secured to the inner surfaces of the face plates so that the sandwich panel design can simultaneously 1) duplicate the load-carrying function of a honeycomb or foam-like core; 2) protect and locate the textiles used to capture and dissipate projectile energy; 3) dissipate additional energy via sacrificial pin breakage or yielding or bond failure, 4) provide a defined barrier to through thickness thermal conduction, and 5) in the event that the pin array is thermally and/or electrically conductive, provides a passive self-diagnostic capacity to reveal pin damage caused by a non-penetrating ballistic strike by means of changes in the through thickness thermal and/or electrical conductivity of the damaged area. The sandwich panels may be fabricated as flat, singly curved, or double curved panels, or as continuous or segmented panels of any other contour within the skill of a person having ordinary skill in this art.

Preferably, the properties of the sandwich panel are designed and scaled such that the ballistic threat of concern can pass through the front face sheet and then enter the core region where the projectile's energy is progressively gathered by the one or more fabric layers and transferred out transversely into the sacrificial pin array. The front facing sheet may be designed to have the capability to blunt or fragment the projectile depending on the threat environment. The thickness of the at least one layer of fabric relative to the thickness of the open core region is purposefully chosen to provide sufficient space to allow conformity by the fabric to the nose of the projectile. As the fabric increasingly conforms to the moving projectile, the pins or pin array are able to progressively absorb projectile energy subsequently causing pin failure. In this context, pin failure should be understood to mean any form, including, but not limited to pin failures in the form of tensile or shear rupture, plastic or viscoelastic yielding, local or global buckling, or end fixation failures including adhesive or cohesive bond failures, or mechanical separation of any other kind. The design and scaling of the invention must purposefully provide that the extent of the sacrificial pin failure extends far from the point of projectile impact and thereby reduces the probability of the projectile reaching and penetrating the rear face sheet. In general, the highest level of penetration resistance is obtained when both the material and fixation of the individual pins are sufficiently weak to allow a very large number of pins to fail without ever concentrating stress in fabric yarns, and thereby tearing through the fabric layer(s).

The sandwich panel provided herein embodies a core structure comprised of a purposeful small-scale assembly of lightweight component materials. The structure is secured within an open core region and may initially be positioned therein using low density foam tooling that is later removed to reduce weight and to reduce the ability of the remaining structures to conform to an incoming projectile. Thus, the present invention provides a lightweight structure of defined thermal conductivity that can be advantageously used in the manufacture of lightweight load-bearing structures that also require thermal and ballistic protection sufficient to prevent penetration by sporadic small arms ground fire when integrated into existing aircraft structures. One or more methods and structures described in this application can comprise or be seamlessly integrated into selected areas of large curved or flat sandwich panels used in the construction of aerospace vehicle, such as the cargo holds, wings, and fuel tanks of military aircraft.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Figure 1A:
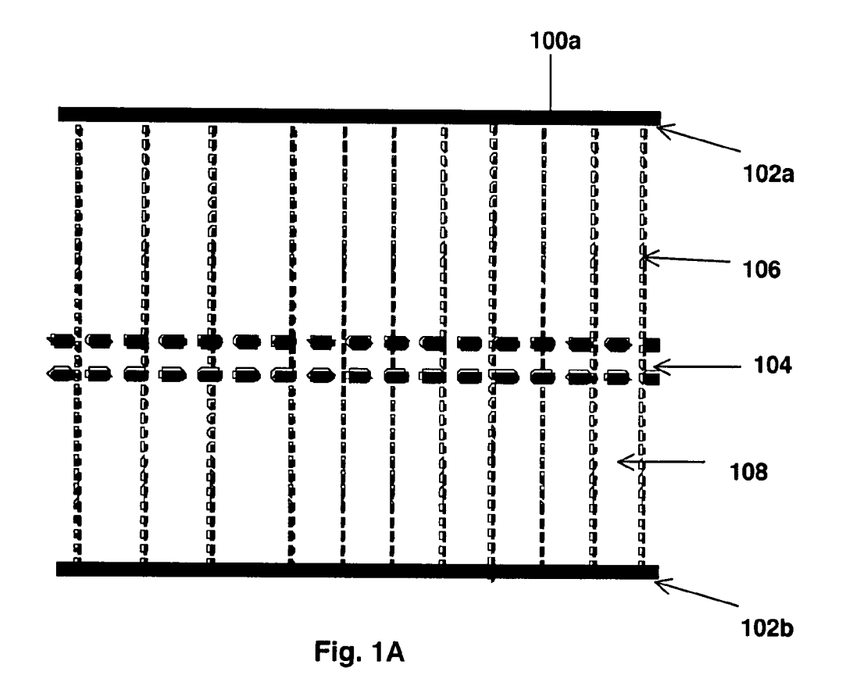
FIGS. 1A-1B are schematic diagrams of a sandwich panel structure according to two aspects of the present invention.
Figure 1B:
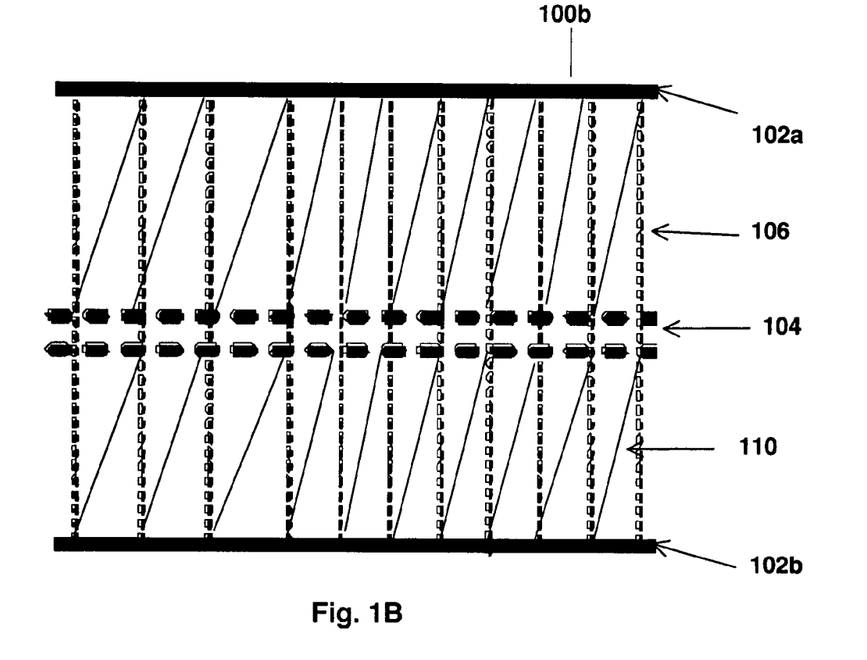

With reference to FIG. 1A, a sandwich panel 100 is described. The sandwich panel 100a includes at least two rigid face sheets of which one is a front face sheet 102a and one is a rear face sheet 102b, at least one layer of fabric 104 between the face sheets 102a,b within an open core 108 formed between the face sheets and a plurality of pins or pin array 106 extending through the fabric and secured to the face sheets. Alternatively, with continued reference to FIG. 1A, FIG. 1B depicts a sandwich panel 100b with the front 102a and rear 102b face sheets, the fabric 104 and the plurality of pins or pin array 106, as described. However, a core 110 comprising a low density tooling material is formed between the face sheets 102a,b.

The rigid face sheets 102a,b may comprise any suitable materials known in the art. The rigid face sheets may enclose and provide protection to the ballistic fabric. The face sheet facing the side where a projectile may impact is a front face sheet. The other face sheet is a rear face sheet. The front facing sheet may be designed to offer minimal resistance to a focused weapon strike whereupon the one or more projectiles may break into the core so that projectile energy is gathered by the fabric and fed into the pin arrays to reduce rear face impact. The rigid face sheets may shield the ballistic fabric from the effects of abrasion, ultraviolet light, moisture, and chemical degradation.

The rigid face sheets may be made from a wide variety of materials known to persons skilled in the art and can be selected based upon the particular use intended for the panel. The front face sheet and rear face sheet can be made of either the same material or of different materials. Similarly, the two face sheets may have the same, similar or different dimensions.

Some non-limiting examples of materials suitable for the face sheets include engineering metals, such as plain carbon, alloy, or stainless steel, high strength aluminum alloys, titanium and copper, unreinforced and fiber or particle reinforced engineering thermoplastic or thermoset plastics, and other high performance composites including woven carbon fiber in a carbon matrix and various dispersions of alumina, silicon carbide, and boron carbide in metal, polymeric, and/or ceramic matrices. Thermoset or epoxy resin impregnated fibers are also referred to as composite materials or simply "composites". A composite is typically made by impregnating one or more layers of fibers with an uncured resin. After curing, the resulting composite may include fibers embedded in a cured resin matrix. The combination of fibers and resin matrix can produce sheets that are particularly strong and lightweight.

The fiber materials used in composites may vary widely and include glass, graphite, boron and ceramic fibers. Fibers may encompass an extremely wide variety of sizes, shapes and configurations. Woven fabric, unidirectional fibers, randomly oriented fiber matting, and chopped fibers are non-limiting examples. Both thermosetting and thermoplastic resins can be used in composites. Numerous types of matrix resins are available, epoxy resins are one popular example of matrix resins. The materials most frequently used to fabricate the face sheets of aerospace sandwich panels are woven carbon fiber pre-impregnated with partially cured epoxy, or aluminum. A preferred material is a composite boron carbide particle/magnesium matrix.

The face sheets 102a,b can be of any suitable thickness and may depend on factors such as type of material, intended use, location of the panel, etc. For example, in case of fiber reinforced epoxy face sheets the thickness can range from as little as 0.005 inches to as much as 0.5 inches. A common process for fabricating composite material face sheets involves first preparing a number of separate fiber layers that are each impregnated with an appropriate amount of a liquid resin such as a thermosetting or thermoplastic resin. A desired number of impregnated layers can be laminated together to form an uncured skin that may be cured prior to or during formation of the sandwich panel.

The fabric or ballistic fabric 104 is held in place between the rigid face sheets by the pins and may be any fabric found to be effective in slowing and capturing the projectile. Non-limiting examples of ballistic fabrics commonly used in this regard are as described supra. In the present invention, the additional role of the fibers comprising the fabric is to elastically transfer additional energy into the pins or pin array. An important feature of the panel construction is that the fabric within the core region is protected against exposure to the elements as long as the front and rear face sheets remain intact. In extremely weight critical applications, the fiber material could be Dupont's ballistic aramid KEVLAR 129, however, this widely used ballistic fabric material is now known to be susceptible to environmental degradation by salt water, perspiration, ultraviolet light, and abrasion. Hence, in some cases, it may be preferable to use 304 or 316 stainless steel fabrics if the panel will be exposed to severe environmental conditions. Non-limiting examples of fibers are described supra. The ballistic fabric can be either woven or non-woven and can be deployed as one or more layers.

The thickness of the ballistic fabric 104 is chosen such that it would provide sufficient space in the core to a) allow conformity by the fabric to a projectile, b) allow the pins to absorb energy and deform or break, and c) to reduce the probability of the projectile impacting upon the rear face sheet. Generally, the aggregate thickness of the fabric layer(s) is substantially less than the total thickness of the core region. In some examples, the aggregate thickness of the fabric 104 is much less than 50% of core region may be about 0.05 inches to about 5 inches. In other examples the fabric layers comprise at least one and up to 100 layers, e.g., up to 50 layers, of a woven or non-woven fabric may be contained within the core region.

The pins 106 may be any type that can dissipate energy, retain and tension the fabric and transfer shear and compression loads. The pin array is sufficiently stiff and strong to be able to carry some shear and compression loads while retaining the ballistic fabric in position. However, during a ballistic strikes, the pin array must also be sufficiently deformable and weak to allow a large number of pins to be, inter alia, deformed, crushed, broken, or separated from the face sheets during the process of projectile impact, and prior to the projectile reaching the rear face sheet. Thus, the pins are referred to and designed to function as sacrificial pins.

The pins are arranged in the pin array so that pin failure extends far from the point of impact of a projectile thereby ensuring that the accumulated pin failure dissipates a meaningful fraction of the total energy of the projectile, over and above the amount that could be dissipated by the ballistic fabric alone. In some examples, the arrangement is such that it allows failure of at least 1000 and as many as 10,000 or more pins per projectile impact. Factors that may influence structural, ballistic, and thermal performance of the thermo-mechanical barrier panel constructed include pin spacing, pin material, pin dimensions, and edge clamping conditions.

The pins 106 may be made of any suitable material based on the chosen metric of armor performance. Generally, the choice of pins which are sufficiently weak and flexible must be informed by accurate knowledge of and accounting for the ballistic strength and effective in-plane modulus of the ballistic fabric. In one example, the pins are sufficiently weak to fail when a lateral load substantially less than 1 lb is applied at their midsection by the ballistic fabric construct. For a different example, when maximum energy dissipation is desired, the pins are made of a stiff relatively weak pitch precursor such as carbon fiber. For yet another example, when the minimum back or rear face sheet deflection is desired, the pins are made of a high modulus, high strength material such as boron or silicon carbide. In a particular example the pins may be nail shaped (Headed Nails).

Figure 2:
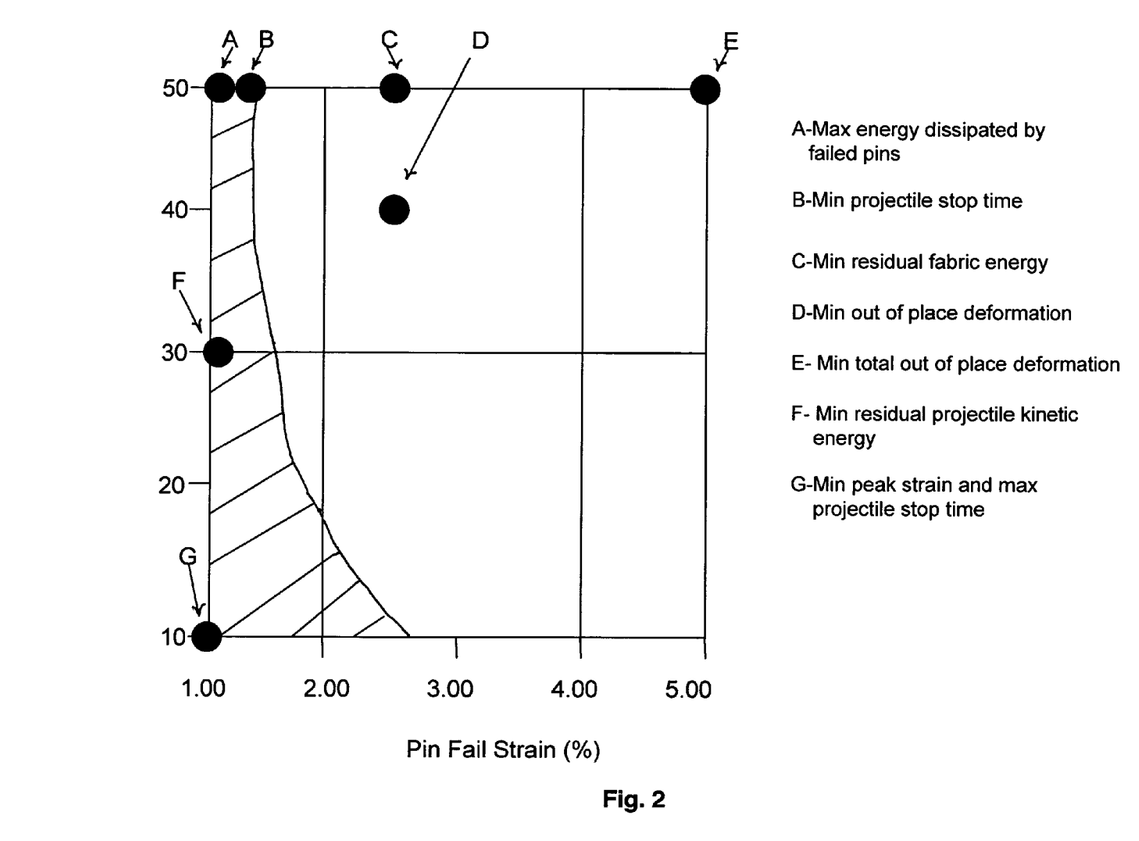
FIG. 2 is an E vs strain map depicting optimal conditions for pin selection where A is the maximum energy dissipated by failed pins, B is the minimum projectile stop time, C is the minimum residual fabric energy, D is the minimum out of plane deformation, E is the total out of plane deformation, F is the minimum residual projectile kinetic energy and G is both the minimum peak strain and the maximum projectile stop time.

FIG. 2 provides a computer simulation-based pin material selection chart. This chart identifies specific combinations of material properties and thereby provides a scientific basis for selection of materials based on purposeful model-based consideration of the optimal desired metric of armor efficacy. In this case, various geometric properties have been held fixed and the combined effects of pin material stiffness, i.e., longitudinal Young's modulus, and ultimate strength have been evaluated By means of large scale computer simulation of the process of ballistic impact. One skilled in the art might be able to use an simpler analytical model to approximately identify a candidate combinations of pin modulus and strength but it is more desirable that this process be guided by dynamic impact computer simulation. As a general guideline, the use of weak flexible pins will allow the fabric layers to absorb substantially more energy without tearing than the same fabric retained by stiff strong pins.

The pin failure strain or strength at failure is another factor that can influence the selection of the pins and pin arrangement. If correctly designed, the progressive failure of many pins can extract more than 25% of the total energy carried by a 0.223 bullet at 1500 fps while also buffering and reducing the peak stress carried by the fabric. This has various desirable and interrelated effects that can only be appreciated in a quantitative fashion by means of computer simulation, but principally include a marked reduction in the peak yarn stresses, a lengthening of the duration but a reduction in the peak force acting of on the panel during the ballistic strike, and a significant reduction in the risk of through penetration by a specified threat.

The pin material selection chart was derived from a series of large scale ballistic impact simulations using a cargo net model. The dynamic structural analyses were performed using Linux-based Abaqus Explicit operating on a 3.2 GHz Pentium IV processor. Abaqus uses a solution algorithm well proven for impact and its user interface facilitated parametric analysis of the effects of various combinations of pin material properties with a particular geometric configuration of the pinned cargo net. By limiting the maximum time step to 4-8 microsec and by utilizing artificial solution damping, solution noise related to the very rapid propagation of the ballistic shock wave out in the transverse direction could be acceptably controlled and mediated. The total duration of the ballistic strikes simulated was always less than one millisecond.

All of the simulated test panels had a ½ thick core region separating two 0.04 inch thick facing sheets indicating a total sandwich panel thickness of 0.58 inches, a square area of 10 in×10 in, and pinned along all four edges. Similarly, all of the simulated projectiles were 0.223 calibre round nose bullets striking the panel at right angles and represented as a rigid hemispherical surface with a mass of 55 grains initially moving at a velocity in the range of 500 to 3000 ft/sec. The cargo net model consisted of a regular square grid of 0.017 inch diameter truss elements spaced at 0.10 inch and assigned the properties of uncoated plain weave Aramid fabric with 0.010 inch diameter yarns spaced at 0.033 inch.

The net was loosely anchored to the facing sheets by 0.020 inch diameter by 0.50 inch long solid pins centered between each yarn crossover point. The resulting pinning density on an areal basis was therefore 3.1%, indicating that the effective through thickness thermal and electrical conductivity of the pin array was about 3.1% that of the pin material. In all simulations, the pin material was assumed to be linear elastic up to brittle failure and the Young's modulus was varied from 10 to 70 Msi. While possible, alternative assumptions about the mechanism of pin failure should not be expected to change the basic and desirable nature of the panel's response to impact. The pin failure strain was varied from 0.5 to 5.0%, implying ultimate strengths as low as 50 Ksi or as high as 3500 Ksi. As a control, impact simulations were also conducted for an unpinned panel backed by equivalent mass textile armor.

The predicted weight increase with four layers of Kevlar behind the unpinned panel was +18%, whereas the predicted increase using the same four layers inside the optimally pinned hybrid material was only +9% with foam removal. In the latter case, the predicted level of ballistic protection by the pinned Kevlar was equivalent to the level provided by 9 layers of Kevlar behind an unarmored panel. The overall pattern of the results demonstrated that appropriately scaled pins are effective to more than double the specific ballistic energy capacity of a pinned textile core relative to an unarmored panel backed the same mass of textile.

The pins or pin array 106 of this invention could be fabricated from any type of material, including relatively weak materials that are not usually used as structural materials One exemplary type would be a slender glass, metal, or ceramic hollow tube that was purposefully weakened after insertion to further lower the threshold load for failure. Other possible pin materials include various alloys of plain carbon steel, heat treatable alloy steels, 300 and 400 series stainless steel, aluminum, titanium, and copper, plus any number of fiber and/or particle reinforced composite materials, plus various natural or man-made polymers including wood, wood products, rayon, and other cellulose based polymers, E-glass, poly p-phenylene terephtalamide (also known as Aramid, such as the particular form sold under the tradename KEVLAR 129 by Du Pont, USA), high performance polyethylene (HPPE) fiber (such as the particular form sold under the tradename SPECTRA 1000 manufactured by Allied Signal, Inc., USA), many other thermoplastics, and various ceramics such as alumina, boron carbide, and silicon carbide.

Optimal pin diameter is a function of pinning density and many other factors, and must be purposefully chosen such that the necessary degree and extent of pin breakage is facilitated. For example, pins may have a circular or a non-circular cross-section. Depending on the relative scaling of pin density, pin stiffness, pin strength, fabric stiffness, and fabric strength, the optimal pin cross-sectional diameter could range from as little as 0.001 inches to as much as 0.2 inches or more. In one example, the pins are about 0.025 inch in diameter, but do not have a circular cross-section. Pins can be straight round cylinders, or they can be Z-shaped or J-legged, or they can have a sharp point at one end directed either towards or away from the threat, or they can have a head or other flange-like termination at the other end, or they can have any other shape as long as they are relatively slender and pin-like. For example, in some embodiments, all or part of the pin shank may be barbed or notched or otherwise indented to facilitate its breakage, or to retain the fabric, or for some other purpose.

The number of pins that may be disposed through the ballistic fiber varies depending upon, inter alia, intended use, location of the panel, type of material, number of layers of ballistic fabric. Pin number can be as few as 10 pins per square inch up to more than 1,000 pins per square inch of the fiber 104. Also, the density of the pins can be uniform or functionally graded to achieve the most desirable properties, with the areal density of the pins comprise about 0.1% to about 10% of the total cross sectional area.

The architecture of pin arrangement varies depending on the panel's application and intended payload capacity. The pins or pin array may be arranged in any suitable orientation, as long as they can dissipate energy, retain and tension the fabric, and can transfer shear loads. The pins may be arranged at multiple angles as previously described above. For example, the pins may be arranged perpendicularly to the face sheets. Alternatively, the pins may be disposed at various angles from the perpendicular in relation to the facing sheets such that the axes thereof form an angle to the perpendicular of up to 60 degrees. In another example, the pins are placed transversely to the plane of the ballistic fabric layer extending from one facing sheet to the other. In yet another example, pins may be arranged to form an interlacing arrangement or a self-bracing pyramidal truss. The precise arrangement of the pins will vary, primarily according to the intended structural or load-bearing function of the panel rather than according to the ballistic protection or thermal protection or self-diagnostic functions.

The pins 106 may be arranged so that the ends of the pins are secured to the facing sheets. Typically, the pins are secured loosely to the inner surfaces of the face sheets. In one example, the secured pins do not traverse the front and rear face sheets. Alternatively, the secured pins do not to traverse the rear face sheet. The bonding or securing of the pins to the face sheets may be achieved by any suitable means known in the art, such as, but not limited to, adhesives, brazing, welding, or purely mechanical means. In one example, the pins are arranged such that their ends are embedded into the inner surface of the face sheets. In another example, the pins are arranged such that the ends of the pins are securely bonded to the facing sheets. Securing the pins may be performed at any stage during fabrication of the sandwich panel.

The optimal choice of pin properties varies according to the chosen metric. The modulus and strength of pins can effect the selection of the pins. For example, stiff weak pins maximize energy dissipation but stronger pins minimize backface deflection and softer pins minimized peak fabric stress.

The core region formed between the pair(s) of face sheets, such as between front and rear facing sheets, may otherwise be partially open 108 or partially filled by 110 very low density materials. The open area(s) may be formed during panel fabrication by substantially removing, e.g., more than half, the low density tooling materials using any suitable technique known and standard in the art. Low density cellular solids are foam-like materials that are much lighter, that is, 10 to 10,000 times lighter, than the materials forming the face sheets. Possible low density tooling materials include, but are not limited to, metal, polymer and carbon foams, plus various honeycomb, corrugated, cellular, or otherwise periodic structures. For example, a tooling material may be a polystyrene foam which may be dissolved by chlorine bleach once the fabric and pin array have been secured to the facing sheets. Alternately, it is contemplated that, if some other means can be used to position the fabric and pins relative to the face sheets during manufacture, it is not necessary to use any tooling material to stabilize the array prior to securing the pins.

Figure 3:
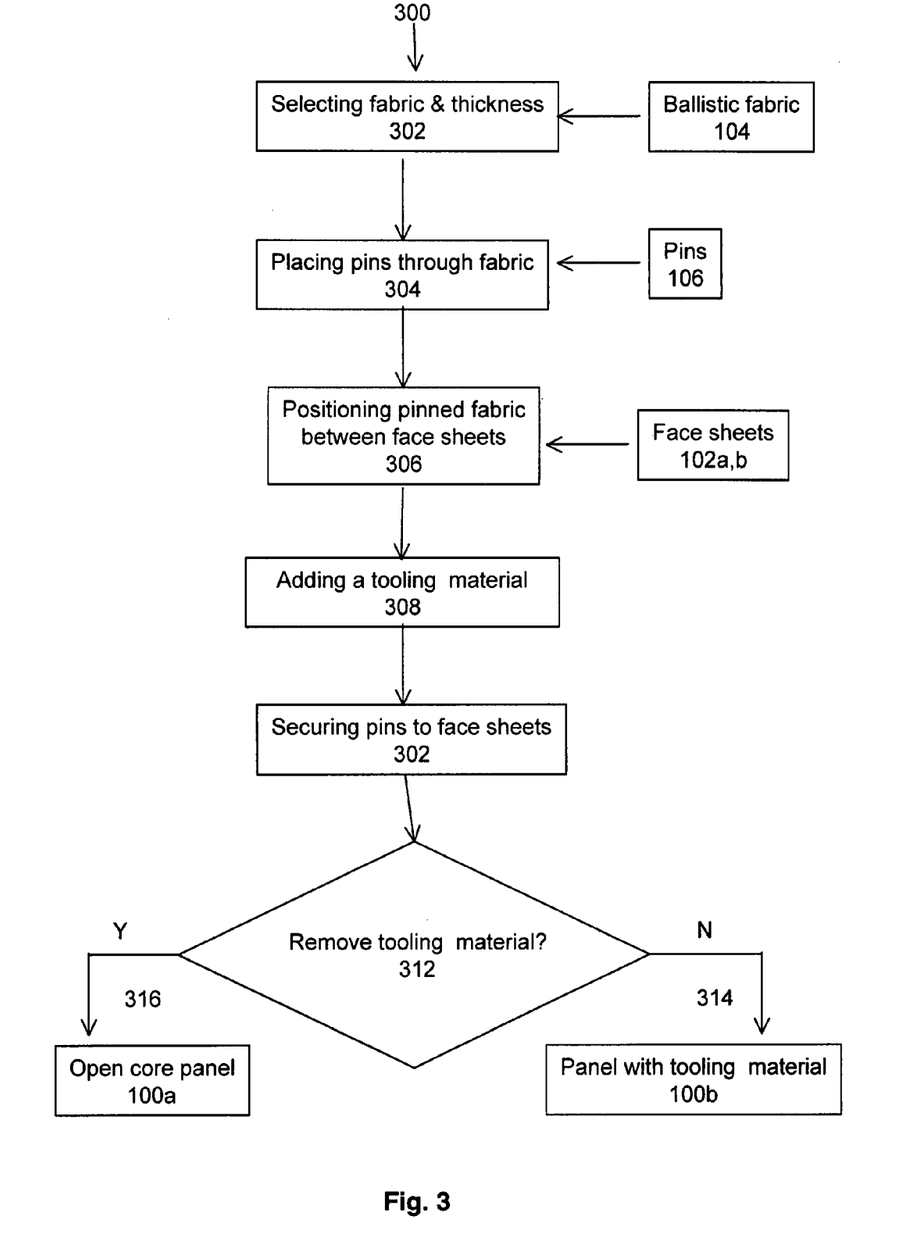
FIG. 3 is a flowchart depicting the method of fabricating sandwich panels according to aspects of the present invention.

A person skilled in the art would appreciate that there are many variations on the standard methods of fabrication of sandwich panels and these available methods can be readily adapted to fabricate the sandwich panels of this invention by substitution of the pinned fabric core in place of a honeycomb or foam core. Particularly, with continued reference to FIGS. 1A-1B, FIG. 3 depicts a flowchart identifying the key steps of a fabrication method 300 for armor-enhanced sandwich panels 100a,b.

At step 302, a fabric, e.g., a ballistic fabric 104 and thickness thereof are selected. The ballistic fabrics and thicknesses are described supra and are chosen to provide the specific benefits and functionalities described herein. At step 304, a plurality of pins 106 selected and are placed through one or more layers of the ballistic fabric 104. The pins can be spaced at a suitable distance from each other to achieve optimal pin density. The pin density can be arranged such that the performance of the pins meets the intended criteria as described herein. The pins can be of any suitable size and shape. For example, the model-based pin material selection chart shown in FIG. 2 may be utilized to selective pin materials and properties. Alternatively, the pin-pierced ballistic fabric layer may be purchased commercially.

Pin placement can be performed using any standard or special-purpose pinning technology or method known to persons skilled in the art. For example, the pins could be positioned relative to an incrementally moving stack of fabric secured to a motor-driven machine table, or by moving a robotic pinning head relative to a stationary stack of fabric. Similarly, the pins can be inserted through the fabric layer(s) by means of standard or special purpose pneumatic or electrically actuated pinning equipment (that inserts the pin at a rapid constant velocity), or by acoustically or ultrasonically vibrating pinning equipment (that inserts the pin at a rapid but fluctuating rate, to reduce the insertion force).

At step 306, the pinned ballistic fabric is positioned between suitable face sheets 102a,b whereupon, at step 308, the pinned material is surrounded by a low density, light weight tooling material. Exemplary materials useful in the low density core are described supra. The low density core holds the pins by covering them so that the pin ends may protrude through the low density core. Methods of forming the low density core with the tooling materials are known and standard in the art.

At step 310 the pins are secured to the rigid face sheets. Exemplary materials useful to form the rigid face sheets are described supra. Securing the pins to the rigid face sheets may be performed using any methods known in the art. For example, the pins may be secured to the face sheets' inner surfaces using welding, bonding or other methods, such as, brazing. Also securing the pins may be performed by using mechanical means. In addition, the pins may be secured to the face sheets upon curing of the structure.

The pin array may be secured only sufficiently to provide structural stiffness and longevity, but loosely enough to detach as a means to dissipate energy throughout the core upon impact from a ballistic projectile. Alternatively, the pins may be securely anchored to the panels, but the pins comprise a material brittle enough to break upon impact to dissipate the impact energy of the projectile away from the point of impact.

At step 312 a decision is made whether to substantially remove the tooling materials surrounding the secured pinned fabric. If no, a sandwich panel 100b comprising tooling materials is fabricated at step 314. If yes, an open core sandwich panel 100a is fabricated at step 316. The low density core may be substantially removed upon completion of securing the pins to the face sheets using methods well known in the art.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sandwich panel, comprising:
    at least two rigid face sheets;
    a core region formed between each of a pair of the at least two rigid face sheets;
    at least one layer of a fabric contained within each core region, said at least one fabric layer having an aggregate thickness selected to provide sufficient space within the core region to allow conformity by the fabric layer(s) to a projectile impacting thereon; and
    a plurality of pins extending through the at least one fabric layer within each core region and secured to the face sheets forming each core region such that the at least one fabric layer are held in place thereby, said pins comprising a sacrificial pin array of an optimally weak pin material within each core region such that one or more of elastic pin deformation, pin yielding, pin breakage or other pin failure occurs transversely along the at least one fabric layer away from a point of projectile impact;
    wherein a combination of pin number, pin spacing, pin material, and pin dimensions within the array defines a thermomechanical barrier along which through-thickness thermal conductivity changes from the point of projectile impact.

2. The sandwich panel of claim 1, wherein a detectable change in the through-thickness thermal conductivity in the pin array at a rear face sheet of the sandwich panel resulting from a non-penetrating projectile impact comprising a comprises means for passive self-diagnosis of pin damage.

3. The sandwich panel of claim 1, wherein the pins are configured such that up to 10,000 pins are effected upon projectile impact.

4. The sandwich panel of claim 1, wherein ends of the pins are bonded, brazed, welded, or adhered to or embedded within an inner surface of the face sheets.

5. The sandwich panel of claim 1, wherein the pins are secured such that the axes thereof relative to the face sheets form one or more angles within the range of 0 degrees to 60 degrees from the perpendicular.

6. The sandwich panel of claim 1, wherein the pins are secured at different angles and configured to form a self-bracing pyramidal truss.

7. The sandwich panel of claim 1, wherein the panel has 100 to 10000 pins per square inch secured therewithin.

8. The sandwich panel of claim 1, wherein the pins comprise a material or a composite material with an average Young's modulus within the range of 0.1 Msi to 100 Msi.

9. The sandwich panel of claim 1, wherein a pin cross-section is circular or non-circular with an average diameter from 0.001 inches to 0.2 inches.

10. The sandwich panel of claim 1, wherein pin materials are natural or engineered wood products, natural or man-made polymers, ceramics, boron, silicon carbide, glass, or metals.

11. The sandwich panel of claim 1, wherein the aggregate thickness of at least one fabric layer is substantially less than a total thickness of the core region.

12. The sandwich panel of claim 1, wherein the aggregate thickness of the fabric layers is 0.005 inches to 5 inches.

13. The sandwich panel of claim 1, wherein the core region is an open core region or comprises one or more layers of a low density tooling material.

14. The sandwich panel of claim 13, wherein the open core is formed by substantially dissolving the one or more layer of tooling material.

15. The sandwich panel of claim 13, wherein the tooling material comprises polymers, metals, carbon foam, an open cell honeycomb, a closed cell honeycomb, corrugated structures, periodic structures, or cellular structures.

16. A method for fabricating a sandwich panel, comprising:
selecting panel components comprising the sandwich panel of claim 1;
placing the plurality of pins through at least one layer of the fabric such that the pins traverse the fabric;
positioning the pinned fabric within each core region formed between one or more of a pair of the face sheets;
surrounding the pinned fabric with one or more layers of a low density tooling material effective to hold the pins in place securing the pins to the inner surfaces of the face sheet pairs to form a pin configuration; and
substantially dissolving the one or more layers of the low density tooling material, thereby fabricating the sandwich panel.

17. The method of claim 16, wherein the low density tooling material comprises polymers, metals, carbon foam, an open cell honeycomb, a closed cell honeycomb, corrugated structures, periodic structures, or cellular structures.

18. The method as claim 16, wherein the pins are configured not to traverse a rear face sheet comprising the at least two face sheets after a projectile strike.

19. The method of claim 16, wherein the secured pin configuration maintains the at least one fabric layer substantially in the middle of each core region while minimally constraining the fabric from conforming to an incoming projectile.

20. The method of claim 16, further comprising:
armoring a vehicle with the sandwich panel.

21. The claim of 20, wherein the armored vehicle is a military fixed wing aircraft or helicopter at risk for sustaining weapon strikes or a manned or unmanned space vehicle at risk for sustaining micrometeoroid strikes.

22. A lightweight load-bearing panel providing protection from projectile impact for a structure in need thereof, comprising:
at least two rigid face sheets including a front face sheet and a rear face sheet;
an open core region formed between each of a pair of the at least two rigid face sheets;
at least one layer of a fabric contained within each open core region, said at least one fabric layer having an aggregate thickness selected to provide sufficient space within the open core region to allow conformity by the at least one fabric layer to a projectile impacting thereon; and
a plurality of pins extending through the at least one fabric layer within each open core region and secured to the face sheets forming each core region such that the at least one fabric layer are held in place thereby, said pins comprising a sacrificial pin array of an optimally weak pin material within each open core region such that one or more of elastic pin deformation, pin yielding, pin breakage or other pin failure occurs transversely along the at least one fabric layer away from a point of projectile impact; wherein a combination of pin number, pin spacing, pin material, and pin dimensions within the array defines a thermomechanical barrier along which through-thickness thermal conductivity changes from the point of projectile impact.

23. The lightweight load-bearing panel of claim 22, wherein a detectable change in the through-thickness thermal conductivity in the pin array at a rear face sheet of the sandwich panel resulting from a non-penetrating projectile impact comprises means for passive self-diagnosis of pin damage.

24. The lightweight load-bearing panel of claim 22, wherein the pins are configured such that up to about 10,000 pins are effected upon projectile impact.

25. The lightweight load-bearing panel of claim 22, wherein ends of the pins are bonded, brazed, welded, or adhered to or embedded within an inner surface of the face sheets.

26. The lightweight load-bearing panel of claim 22, wherein the pins are secured such that the axes thereof relative to the face sheets form one or more angles within the range of about 0 degrees to about 60 degrees from the perpendicular.

27. The lightweight load-bearing panel of claim 22, wherein the pins are secured at more than one angle and configured to form a self-bracing pyramidal truss.

28. The lightweight load-bearing panel of claim 22, wherein the panel has about 100 to about 10000 pins per square inch secured therewithin.

29. The lightweight load-bearing panel of claim 22, wherein the pins comprise a material or a composite material with an average Young's modulus within the range of about 0.1 Msi to about 100 Msi.

30. The lightweight load-bearing panel of claim 22, wherein a pin cross-section is circular or non-circular with an average diameter from about 0.001 inches to about 0.2 inches.

31. The lightweight load-bearing panel of claim 22, wherein pin materials are natural or engineered wood products, natural or man-made polymers, ceramics, boron, silicon carbide, glass, or metals.

32. The lightweight load-bearing panel of claim 22, wherein the aggregate thickness of the at least one fabric layer is substantially less than a total thickness of the core region.

33. The lightweight load-bearing panel of claim 22, wherein the aggregate thickness of the fabric layers is about 0.005 inches to about 5 inches.

34. The lightweight load-bearing panel of claim 22, wherein the structure is an armored military vehicle at risk for sustaining weapon strikes or a manned or unmanned space vehicle at risk for sustaining micrometeoroid strikes.

* * * * *